United States Patent [19]

Anderson et al.

[11] Patent Number: 5,145,453
[45] Date of Patent: Sep. 8, 1992

[54] APPARATUS FOR MACERATING MEAT

[75] Inventors: James E. Anderson, Madison; Gary R. Skaar, Marshall; Paul H. Bernthal, Sun Prairie; Larry C. Gundlach, Madison, all of Wis.

[73] Assignee: Oscar Mayer Foods Crporation, Madison, Wis.

[21] Appl. No.: 588,237

[22] Filed: Sep. 26, 1990

[51] Int. Cl.⁵ .............................................. A22C 9/00
[52] U.S. Cl. ................................................... 452/142
[58] Field of Search ................. 452/142, 141, 143, 144

[56] References Cited

U.S. PATENT DOCUMENTS

| | | | |
|---|---|---|---|
| 24,831 | 7/1859 | Storer | 452/142 |
| 2,163,123 | 6/1939 | Huse | 452/142 |
| 2,287,278 | 6/1942 | Spang | 452/142 |
| 2,339,890 | 1/1944 | Stukart | 452/142 |
| 2,360,729 | 10/1944 | Spang | 452/142 |
| 2,398,636 | 4/1946 | Henney et al. | 452/142 |
| 2,409,463 | 10/1946 | Ahrndt | 452/142 |
| 2,437,069 | 3/1948 | Brownsey | 452/141 |
| 2,531,105 | 11/1950 | Brown | 452/142 |
| 2,545,407 | 3/1951 | Jackson | 452/142 |
| 2,886,845 | 5/1959 | Byland et al. | 452/142 |
| 3,222,713 | 12/1965 | Stein et al. | 452/142 |
| 3,893,384 | 7/1975 | Lo Biondo et al. | 452/142 |
| 3,924,011 | 12/1975 | Kera et al. | 452/142 |
| 4,085,482 | 4/1978 | Charron | 452/141 |
| 4,133,075 | 1/1979 | Collins | 452/142 |
| 4,254,533 | 3/1981 | LoBiondo et al. | 452/142 |
| 4,270,244 | 1/1981 | LoBiondo et al. | 42/142 |
| 4,313,963 | 2/1982 | Greenspan | 452/142 |
| 4,348,787 | 9/1982 | Wolff | 452/142 |
| 4,453,288 | 1/1984 | LoBiondo et al. | 452/142 |
| 4,462,139 | 7/1984 | Hubbard et al. | 452/142 |
| 4,531,259 | 7/1985 | Bridge, Jr. | 452/142 |
| 4,660,253 | 4/1987 | LoBiondo et al. | 452/142 |
| 4,672,716 | 6/1987 | Dickey | 452/142 |
| 4,776,064 | 10/1988 | LoBiondo et al. | 452/142 |

*Primary Examiner*—Willis Little
*Attorney, Agent, or Firm*—Lockwood, Alex, Fitzgibbon & Cummings

[57] ABSTRACT

An apparatus for macerating meat-type products includes a pair of counterrotating shafts, each of which contains a one-piece arbor having an integral assembly of alternating radially projecting and axially extending teeth members and spacer members. A plurality of open channels are defined by the spacer members disposed between adjacent radially projecting teeth members. Each of the teeth members has a peripheral outer edge which penetrates the products passing through the counterrotating arbors in the axial plane.

28 Claims, 5 Drawing Sheets

APPARATUS FOR MACERATING MEAT

BACKGROUND AND SUMMARY OF THE PRESENT INVENTION

The present invention relates generally to an apparatus for macerating meat products to improve the texture, water holding capacity and tenderness thereof. More particularly, the present invention relates to an improved apparatus for macerating meat products by passing the meat products through a pair of parallel rotating shafts having radially extending teeth which project into the meat and break up meat tissues.

It is well known that the water holding capacity and the textural properties of processed meat products can be greatly improved by macerating raw materials prior to further processing. Maceration results in the rupturing or tearing of the raw material muscle fibers. This physical action results in increased protein solubilization and exposes more surface area or 'binding sites' for water molecules. After maceration, the bonding ability of the muscle pieces is also enhanced, which allows macerated meat products to be more easily joined together, such as by physical pressure, and then subsequently molded and cooked.

Maceration further results in reduced holding time from the time of non-meat ingredient addition to cooking because it increases the surface area of the meat product, which results in deeper, more rapid penetration and quicker intake of these non-meat ingredients into the muscle fibers.

Many devices exist in the art for macerating meat. Typically these macerating devices include rotary circular blades, radial tines, or relatively broad teeth which are either mounted on a single shaft supported above a meat-supporting or conveying table or which are mounted on a pair of spaced-apart opposing rotating shafts having a central gap therebetween through which the meat product passes. However, these devices suffer from certain disadvantages. In one aspect, the macerating rotating shafts are usually composed of a plurality of macerating members and spacing components which are assembled onto a base shaft. The use of multiple individual components increases the time and effort required to clean the macerating shafts because the shafts must be completely disassembled to ensure that no meat juices or tissue remnants remain on any of the components which would pose a bacteriological problem. In another aspect, where a stripper member or comb is used with multi-component macerating shafts to remove meat from the intervening spaces between the macerating components, the comb may tend to force tissue remnants into the spaces between the spacer and macerating components, thereby necessitating more frequent cleaning of the macerating shafts.

The present invention is directed to a construction which avoids the aforementioned disadvantages. In a macerating apparatus constructed in accordance with the principles of the present invention, a pair of rotating macerating rollers or shafts are disposed generally parallel to each other in a spaced-apart relationship to define a gap therebetween through which meat products are drawn. The macerating shafts each have a formed one-piece arbor affixed to it, which arbor has a plurality of radially projecting macerating portions or teeth which are disposed on the respective longitudinal axes of the shafts. Adjacent macerating teeth are separated by spacer portions which serve to define a plurality of channels between the macerating teeth. The two macerating shafts are aligned in an axially offset manner such that the macerating teeth of one shaft project into the channels of the other shaft. The macerating teeth are generally triangular in shape and have respective meat contacting and penetrating peripheral edges. These peripheral edges are axially directed and have a sufficient thickness to effect shallow penetration of the meat in the plane perpendicular to the direction of travel of the meat through the macerator. The macerating teeth project only a short distance into the separating channels of the opposing shaft so that a shallower penetration and greater compression of the meat product is obtained. The one-piece construction of the macerating shaft arbors minimizes the cleaning time thereof and reduces the likelihood of the accumulation of meat product tissues on the arbors over time.

Accordingly, it is a general object of the present invention to provide an improved apparatus for macerating meat products by passing the meat products through a pair of counter-rotating opposing macerating shafts.

It is another object of the present invention to provide an apparatus for macerating meat products by passing the meat products through a pair of counter-rotating macerating shafts, wherein each of the macerating shafts includes a one-piece arbor affixed thereto, each arbor having a plurality of radial rings projecting outwardly and separated from each other by spacer portions.

Another object of the present invention is to provide a macerator wherein the macerating shafts have a plurality of macerating rings which project radially outwardly from the shaft and wherein the peripheral edges of the macerating rings include a series of teeth having a relatively sharp cutting edge disposed in an axial plane parallel to that of the shaft.

Yet another object of the present invention is to provide an improved macerator apparatus having macerating shafts of substantially one-piece integral construction which improves the sanitary characteristics thereof.

It is yet another object of the present invention to provide an apparatus for macerating meat products in which shallow penetration of the meat is obtained in the axial plane of the meat product.

Another object of the present invention is to provide an improved macerator apparatus that effects a superior crushing action as opposed to a cutting action on the meat which crushing action results in finished product color uniformity enhancement which enhancement is believed to be due to improved dispersion of heme pigments resulting from increased cell membrane disruption.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DETAILED DESCRIPTION OF THE PREFERRED EMBODIMENT

Figure 1:
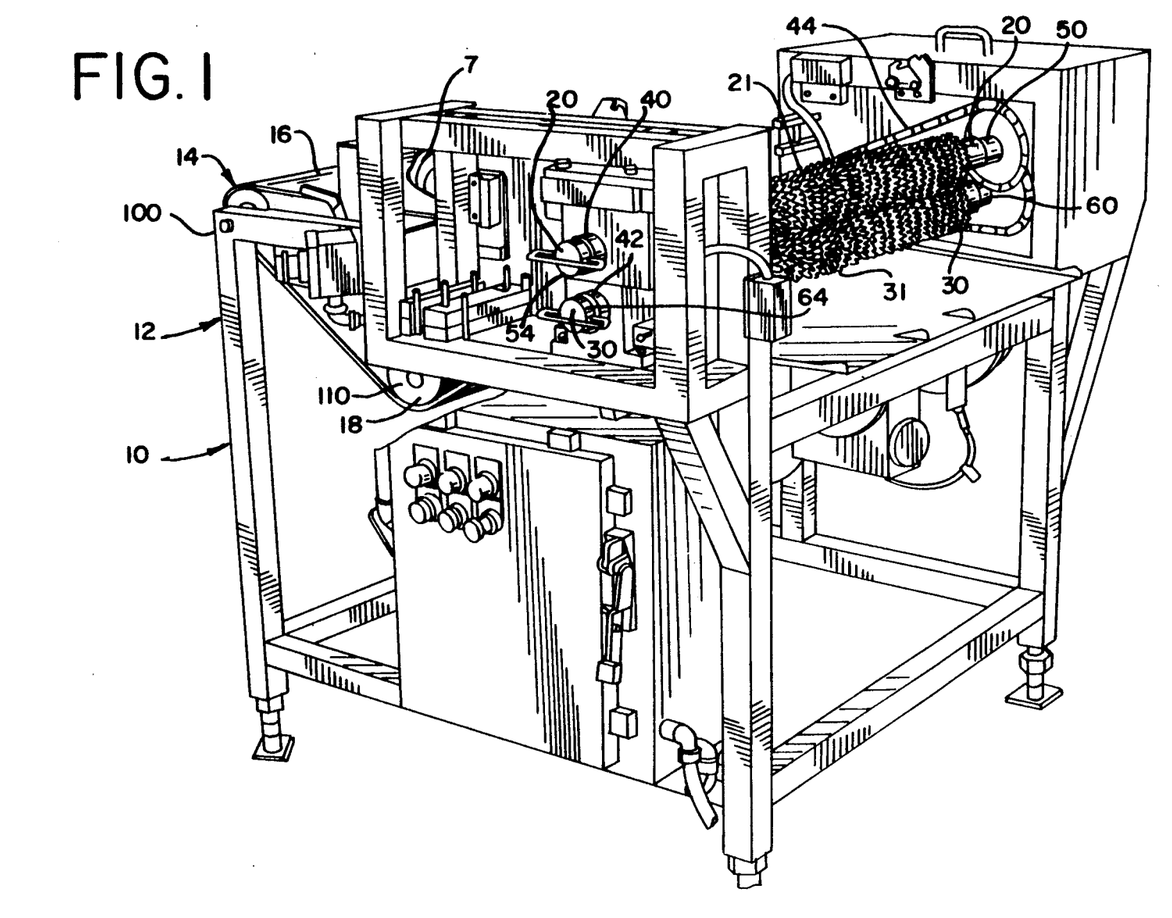
FIG. 1 is a perspective view of an apparatus for macerating meat products constructed in accordance with the principles of the present invention.

FIG. 1 illustrates an apparatus 10 for macerating meat products. Included is an upstanding frame 12 which is generally rectangular in form. The frame 12, at its forward end, includes a conventional food conveyor assembly 14 having a belt 16 and an associated conveyor drive mechanism 18. The conveyor belt 16 is disposed within the outer members 100, 102 of the apparatus frame 12 and leads up to a pair of macerating rollers or shafts 20, 30. The macerating shafts 20, 30 are rotatably mounted in conventional bearings 40, 42 at the downstream end of the apparatus frame 10. The shafts 20, 30 are driven in counterrotation, by conventional drive mechanisms 44, 46 such as toothed belts or chain drives, preferably in a manner whereby the shafts 20, 30 rotate at the same speed.

The endless conveyor assembly 14 is provided for supporting a meat product 7 thereon and delivering it to the macerating shafts 20, 30. The conveyor belt 16 is of conventional construction and may be formed from any flexible material suitable for use in food processing applications and either may be driven by an independent drive mechanism 110 or may be driven by either of the drive mechanisms 44, 46 associated with the macerating shafts 20, 30. In either instance, it is preferable to have the speed of the conveyor belt 16 synchronized with the speed of the macerating shafts 20,30.

Figure 3:
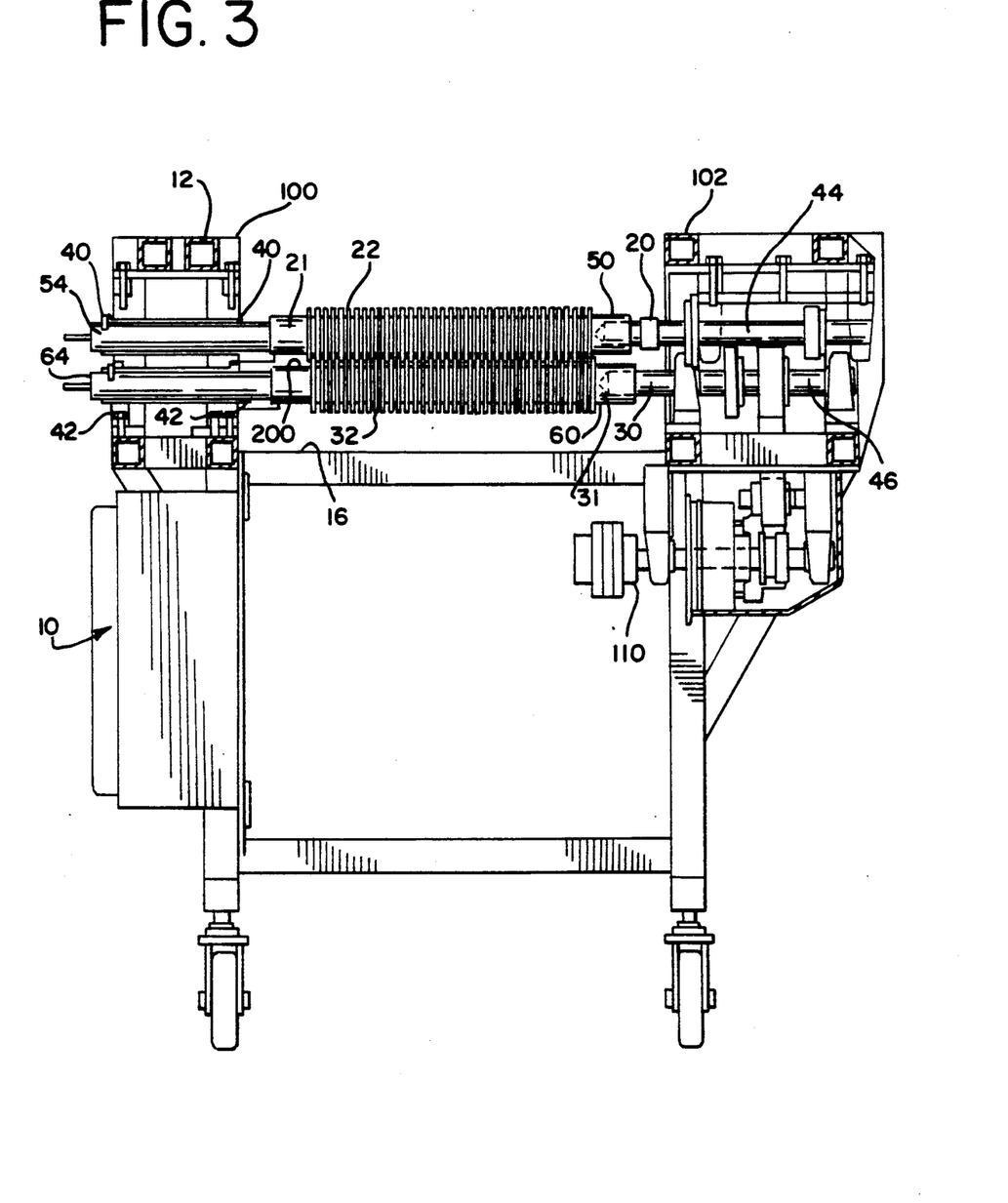
FIG. 3 is an elevational view of the apparatus of FIG. 1.
Figure 4:
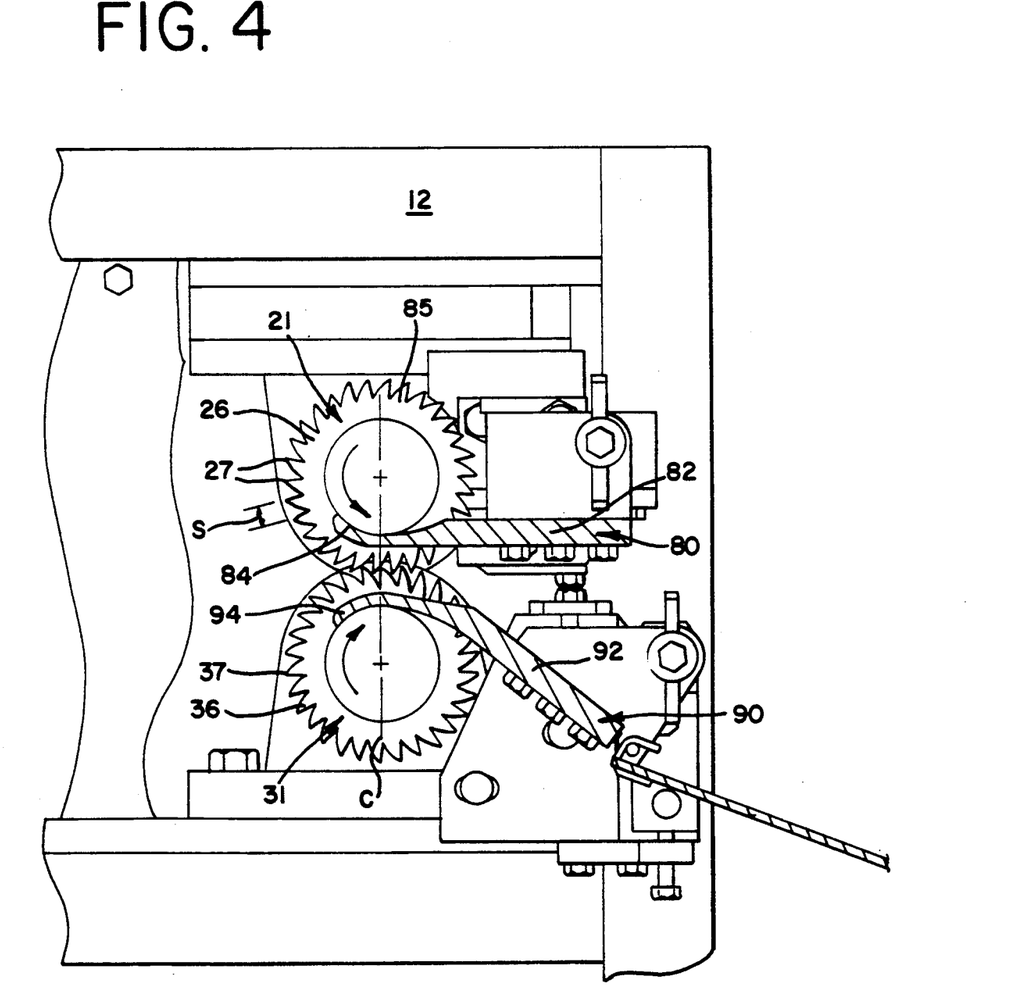
FIG. 4 is a transverse cross-sectional view along the line 4—4 of FIG. 3.
Figure 5:
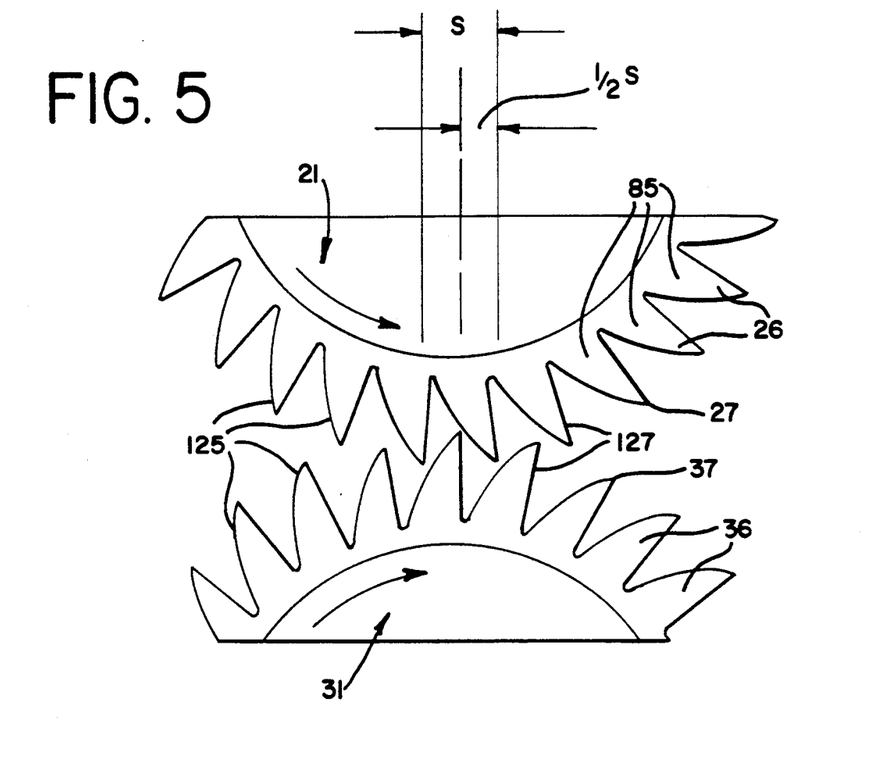
FIG. 5 is an enlarged sectional view of a portion of the macerating shafts shown in FIG. 4.
Figure 6:
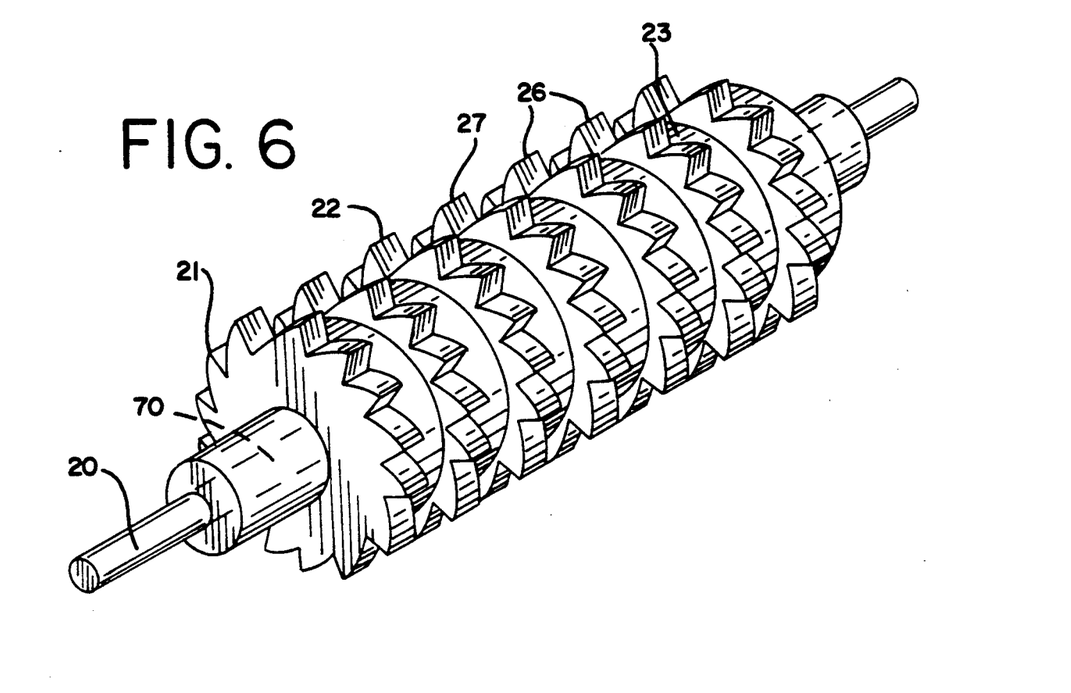
FIG. 6 is a perspective view of a second embodiment of a macerating shaft.

Each macerating shaft 20, 30 includes an elongated arbor 21, 31 which generally spans the width of the apparatus frame 12. The arbors 21, 31 may be formed as an integral sleeve with a central cavity 70 extending therethrough (FIG. 6) which cavity 70 is adapted to receive the respective first and second drive shafts therein. Alternatively, as shown in FIGS. 3-5, the arbors 21, 31 may be substantially solid in cross-section and may include at least one hub portion 50, 60 disposed at an end thereof. The arbor hub portions 50, 60 of each arbor contain generally central cavities 51, 61 which are adapted to engage drive shafts 52, 62. The end opposite the hub portions serve as spindles 54, 64 which are rotatably mounted on the apparatus frame. The macerating arbors 21, 31 which are driven by the shafts 20, 30 are adjustably mounted on the apparatus frame 12 so that the gap 200 present between the arbors 21, 31 can be adjusted in accordance with the meat to be processed by the apparatus.

Figure 2:
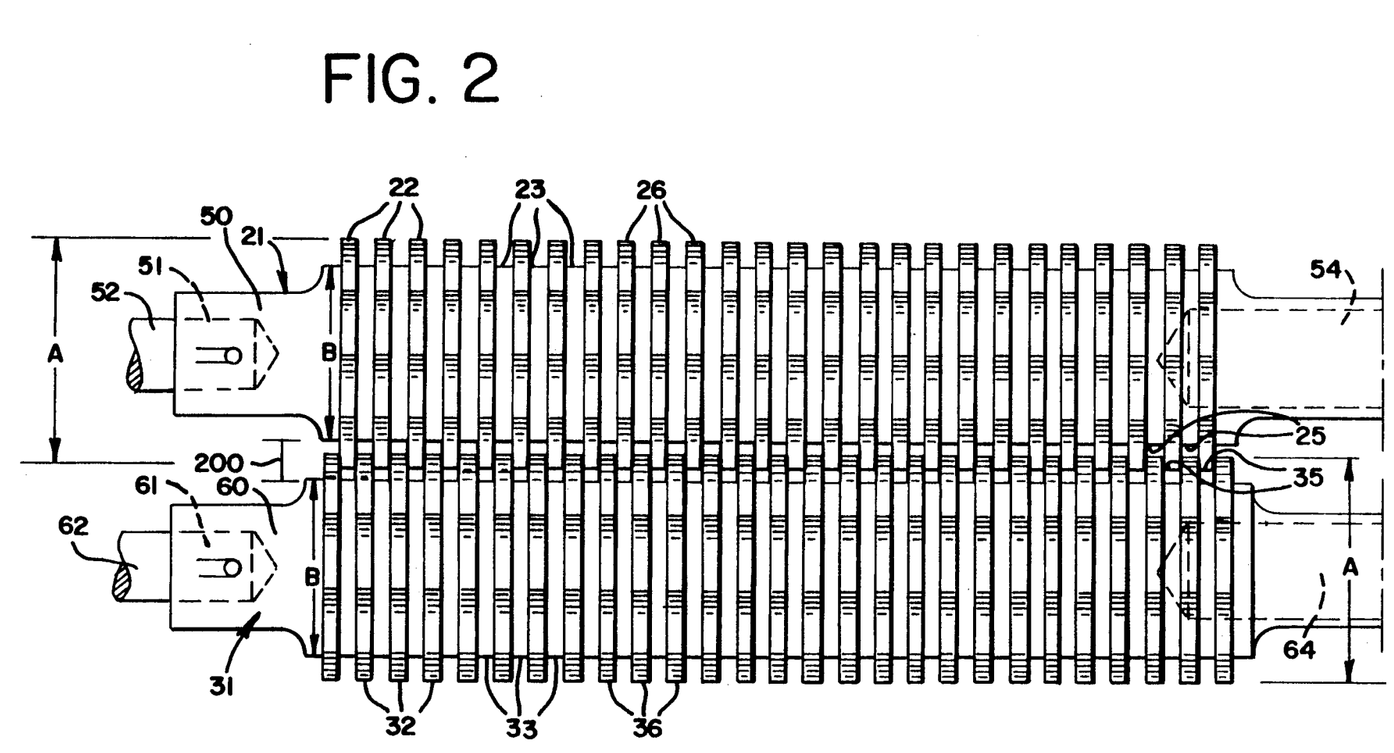
FIG. 2 is a fragmentary elevation view of the apparatus of FIG. 1, illustrating the macerating shafts.

As shown in the preferred embodiments depicted in the Figures, each arbor 21, 31 is of integral construction and thus is formed from a single piece of metal. Each arbor 21, 31 has a series of alternating radially projecting portions 22, 32 which are equally spaced along the longitudinal axis of the respective arbor. The radially projecting portions 22, 32 have a first diameter A. (FIG. 2) The radially projecting portions 22, 32 are separated by spaced-apart portions 23, 33 having a second diameter B which is less than the first diameter A of the radially projecting portions 22, 32. The axial spacing of the first and second arbor spaced-apart portions 22, 33 between the radially projecting portions 22, 32 is greater than the axial length of the teeth of the first and second arbor radially projecting portions 22, 32 such that a series of open or crushing channels 25, 35 are defined by the opposing sidewall surfaces of adjacent radially projecting portions 22, 32 and the axial length of the separating, intervening spaced-apart portions 23, 33.

The first and second arbors 21, 31 are mounted in alignment on their respective macerating shafts 20, 30 such that, as they rotate in opposite directions, the radially projecting and axially extending portions 22 of the first shaft 20 are aligned with the open channels 35 formed by the spaced-apart portions 33 of the second shaft 30. Likewise, the radially projecting and axially extending portions 32 of the second shaft 30 are aligned with the open channels 25 formed by the spaced-apart portions 23 of its opposing first shaft 20. Additionally, the first and second arbors 21, 31 are further aligned and synchronized so that, in operation, the radial teeth peripheral edges of one arbor pass through the center point ½S of the spacing S between successive radial teeth on the opposing arbor (FIG. 5).

As shown more clearly in FIG. 5, each first and second arbors radially projecting portions 22, 32 include a plurality of radially projecting teeth 26, 36 having a preselected axial length. The integral teeth 26, 36 have a generally triangular profile when viewed from the side wherein each individual tooth begins with a relatively thick base portion 85 near the second diameter B of the respective arbor and extends radially outwardly to terminate in a narrow, axial meat contacting surface or edge 27, 37 at the apex of the triangular profile. The forward edges 125 of each of the teeth are generally arcuate while the trailing edges 127 are substantially planar (FIG. 5). Successive teeth on each arbor radially projecting portions are substantially equally circumferentially spaced-apart with a uniform spacing S.

The radially projecting teeth 26, 36 may be formed on their respective arbors by conventional machining such that they are integral with the arbors, thereby reducing the likelihood of the bending or breaking of the teeth driving maceration. In an important aspect of the present invention, the axial lengths of these meat contacting surfaces or edges 27, 37 are preferably less than the axial length of the channels 25, 35 formed by the arbor spacer portions between adjoining projecting portions so that the teeth are free to pass through the channels 25, 35 and so that the teeth effect primarily a crushing action on the meat products passed therethrough rather than a cutting action. In this regard, a tooth axial length of 0.25 inches or less, preferably about 0.220 inches and a spacer portion or channel axial length of greater than 0.25 inches, preferably about 0.280 inches. It is further desirable to have an equal clearance present on both sides of the teeth of approximately 0.030 inches for the purposes explained more fully below.

The radial extent of the macerating teeth 26, 36 is such that the meat contacting surfaces 27, 37 preferably project into the open channels 25, 35 for no more than half of their radial extent. In this regard, a radially projecting extent of approximately 0.375 inches for each tooth with a corresponding tooth projection distance of approximately 0.187 inches has been found to give preferred results. It will be understood however, that where poultry products, such as turkey, are used with the present invention, these distances will increase such that the distance between the two arbors is greater to accordingly reflect the difference in the typical thickness of the product passed between the arbors.

Such a construction has been found to give unexpected benefits. When the meat products are passed through the gap 200 present between the macerating shafts 20, 30, the meat is contacted by the radial teeth 26, 36 which penetrate it via the axial meat contacting surfaces 27, 37 at the outermost extent thereof. As the macerating shafts 20, 30 continue to rotate, the meat is pressed into the opposing arbor open channels 25, 35 by the radial teeth and compressed against the arbor spaced-apart portions 23, 33 to effect crushing of the meat tissues. Because of the relatively shallow penetration of the radial teeth 26, 36, i.e. one-half or less of the depth of the crushing channels 25, 35, more crushing or compressing of the meat product is obtained rather than cutting, resulting in overall enhanced product coloration uniformly and water holding capacity of the products passed between the arbors.

Individual combs 80, 90 associated with each of the first and second macerating shafts 20, 30 are provided to assist in stripping the macerated meat products from the macerating shafts. Each comb 80, 90 is preferably mounted at its opposite ends on the apparatus frame and extends transverse to the direction of travel of the conveyor belt 16 and parallel to the longitudinal axes of the macerating shafts 20, 30. Each comb has a body portion 82, 92 and a plurality of individual extensions or side tines 84, 94 which extend between the radially projecting portions 22, 32 of the first and second arbors 21, 31 and abut the intervening spaced-apart portions 23, 33 at the top and bottom of the gap 200 between the macerating shafts 20, 30. The tines 84, 94 extend past the centerline C of the two arbors.

It will be noted that the present invention provides unique advantages in that the one-piece, integral construction of the two macerating arbors improves the sanitary and efficiency characteristics of such apparatus because the time required for cleaning the macerating elements is reduced as compared to multi-component macerating elements and also because there are no mating surfaces into which meat tissue remnants and juices can flow. The one-piece integral construction and the macerating teeth profiles also serve to prevent the breaking of the teeth during macerating operations. Moreover, because the axial spacing of the arbor spaced-apart portions 23, 33 is greater than the axial length of the arbor radially projecting teeth 26, 36 and because of the axial alignment of the first and second arbors, a scissors-type macerating action is obtained, thereby resulting in more crushing of the meat product against the spaced-apart portions 23, 33 rather than cutting of the meat product by the radially projecting portions 22, 32. In this scissors-type macerating action, the radial teeth of one arbor project no more than halfway into the corresponding open channel of the other arbor and wherein as shown in FIG. 5, the teeth of one arbor will substantially rotate in the center of the successive teeth spacing, S of the other roller.

It will be seen that while certain embodiments of the present invention have been shown and described, it will be obvious to those skilled in the art that changes and modifications may be made therein without departing from the true spirit and scope of the invention.

We claim:

1. An apparatus for crushing the tissue of a meat product having improved characteristics for cleaning purposes and the like, the apparatus comprising:

a first rotatable arbor being of one-piece construction and having a series of spaced-apart circumferential ring portions separated by intervening spacer portions, the first arbor ring portions having a first arbor first diameter and the intervening spacer portions having a first arbor second diameter which is less than the first arbor first diameter, whereby an axially extending face of an intervening spacer member and a radially extending face of each of two adjacent ring portions define a plurality of open channels substantially equally spaced along the longitudinal axis of said first rotatable arbor, said circumferential ring portions each including a plurality of outwardly projecting radial ring teeth, each of said first arbor radial ring teeth having a peripheral, axially extending meat contacting edge having a preselected axial length which is disposed generally parallel to the longitudinal axis of said first shaft, said first arbor one-piece construction being characterized by the absence of any opposing radially extending surfaces between said first arbor ring portions and said spacer portions, whereby meat tissue remnants are prevented from entering between said ring portions and said spacer portions;

a second rotatable arbor being of one-piece construction and having a series of spaced-apart circumferential ring portions separated by intervening spacer portions, the second arbor ring portions having a second arbor first diameter, the intervening spacer portions having a second arbor second diameter which is less than the second arbor first diameter, whereby an axially extending face of said intervening spacer portions and a radially extending face of each of two adjacent ring portions define a plurality of open channels in said second arbor substantially equally spaced along the longitudinal axis of said second rotatable arbor, said second arbor circumferential ring portions each including a plurality of outwardly projecting radial ring teeth each of said second arbor radial ring teeth having a peripheral axially extending meat contacting edge having a preselected axial length which is disposed generally parallel to the longitudinal axis of said second shaft, said second arbor one-piece construction being characterized by the absence of any opposing radially extending surfaces between said second arbor ring portion and said spacer portions, whereby meat tissue remnants are prevented from entering between said ring portions and said spacer portions;

said first and second arbors being disposed on a frame generally parallel to, spaced-apart from and in alignment with each other such that said first arbor radial ring teeth respectively project into respective open channels of said second arbor and said second arbor radial ring teeth respectively project into respective open channels of said first arbor; and, means for rotating said first and second arbors in opposite directions.

2. The apparatus of claim 1, further including first comb means associated with said first shaft and second comb means associated with said second shaft.

3. The apparatus of claim 2, wherein said first and second comb means include a plurality of comb tines which extend past the centerline of said first and second arbors and into said respective first and second arbor open channels.

4. The apparatus of claim 1, wherein each of said arbors is mounted on a separate drive shaft.

5. The apparatus of claim 1, wherein said first and second shaft rotating means includes means for rotating said first and second arbors at a constant speed.

6. The apparatus of claim 1, wherein each of said first and second arbor radial ring teeth has a generally triangular configuration in radial cross-section wherein the respective first and second arbor meat-contacting surfaces are disposed at respective apexes of said triangular teeth cross-sections and said preselected axially extending length of each tooth on one arbor is less than the axial length of the opposing channel portion of the other arbor.

7. The apparatus of claim 1, wherein said first and second arbor first diameters are equal and said first and second arbor second diameters are equal, said first and second arbor first diameters being approximately 0.375 inches greater than said first and second arbor second diameters.

8. The apparatus of claim 1, wherein the axial length of each of said first and second arbor radial ring peripheral teeth meat contacting edges is less than the axial length of said first and second arbor spacers, whereby said first and second arbor radial ring teeth pass through said corresponding open channels without interference.

9. The apparatus of claim 8, wherein each of said first and second arbor radial ring teeth has a clearance of approximately 0.030 inches on each side thereof as it passes through a corresponding open channel on an opposing shaft, whereby, when a meat product is passed between said first and second arbors, said meat product is more likely to be crushed than cut.

10. The apparatus of claim 1, wherein said first and second arbors include respective hub portions at one end of each of said first and second arbors, each of said first and second arbor hub portions being adapted to drivingly receive a drive shaft.

11. The apparatus of claim 1, wherein said first and second arbors have an integral drive shaft associated therewith.

12. The apparatus of claim 6, wherein each of said first and second arbor radial ring teeth has a forward edge and a trailing edge, the forward edges of said first and second arbor radial ring teeth being generally arcuate and the trailing edges of said first and second arbor radial ring teeth being substantially planar.

13. The apparatus of claim 1, wherein said outwardly projecting radial ring teeth are substantially equally spaced circumferentially on each of said first and second arbors with successive teeth having a uniform spacing between them.

14. The apparatus of claim 6, wherein said outwardly projecting radial ring teeth are substantially equally spaced circumferentially on each of said first and second arbors with successive teeth having a uniform spacing between them.

15. The apparatus of claim 14, wherein said first and second arbors are axially aligned such that successive apexes of the radial ring teeth on one arbor pass through the other arbor open channels at the midpoint of the uniform spacing between successive teeth of adjacent radial ring portions thereof.

16. A macerator for macerating meat-type products such as beef, pork and poultry, the macerator having improved sanitary characteristics, said macerator comprising:
   means for supporting a meat-type product while it is being conveyed to a location for macerating;
   a first macerating shaft;
   a second macerating shaft;
   the first and second macerating shafts mounted on a frame disposed proximate to said meat product supporting means, said first and second macerating shafts having respective first and second arbors affixed thereto, the first and second arbors being corotatable with their associated first and second macerating shafts;
   said first and second arbors each including a plurality of circumferential ring portions spaced-apart along the longitudinal axes of said first and second macerating shafts and separated by intervening spacer portions, said first and second arbors being of one-piece construction and having no mating surfaces existing between adjoining ring and spacer portions thereof, the first and second arbor circumferential ring portions having a diameter greater than the diameter of said first and second arbor intervening spacer portions, whereby a plurality of meat-type product rushing channels substantially equally spaced along the longitudinal axes of said first and second arbors is defined on said first and second arbors by axially extending faces of intervening spacer portions and radially extending faces of two adjacent portions, the absence of any mating surfaces between ring portions and spacer portions of each of said first and second arbors reducing the number of surfaces for sanitary cleaning to remove any accumulation of meat-type product tissue thereon;
   the first and second macerating shafts being aligned on said frame such that said first arbor ring portions are offset with respect to said second arbor ring portions, whereby said first arbor ring portions project into the second arbor channels and said second arbor ring portion project into said first arbor channels;
   said first and second arbor ring portions each having a plurality of outwardly projecting radial ring teeth;
   each of said teeth first and second arbor radial ring teeth having peripheral, axially extending edge having a preselected axial length disposed generally parallel to the first and second shaft longitudinal axes.

17. The macerator of claim 16, further including first and second means for combing said meat-type product out of said first and second arbor channels, said first and second comb means including respective elongated members disposed parallel to said first and second macerating shafts and extending transversely into said first and second arbor channels.

18. The macerator of claim 16, further including means for driving said first and second macerating shafts, in counterrotation, at constant speeds.

19. The macerator of claim 16, wherein said meat-type product supporting means includes a conveyor, the conveyor being driven by drive means synchronized with drive means for driving said first and second macerating shafts.

20. The macerator of claim 16, wherein said first and second arbor radial ring teeth have a preselected axial length of approximately 0.220 inches and said first and second arbor channels have an axial length of approximately 0.280 inches.

21. The macerator of claim 16, wherein said first and second arbors are substantially solid members, each of said first and second arbors having a hub portion at least one end thereof, the hub portion being adapted to receive driving members of said first and second macerating shafts.

22. The macerator of claim 16, wherein said first and second arbor radial ring teeth project approximately halfway into their corresponding, offset first and second arbor channels.

23. The macerator of claim 22, wherein said first and second arbor ring portions have a diameter of approximately 0.375 inches greater than the diameter of said first and second arbor intervening spacer portions.

24. The macerator of claim 16, wherein the axial length of said first and second arbor radial ring teeth is less than the axial length of said first and second arbor channels such that said first and second arbor radial ring teeth crush said meat-type products passed between said first and second arbors.

25. The macerator of claim 16, wherein said axial length of said first and second arbor radial ring teeth is approximately 0.220 inches and said axial length of said first and second arbor channels is approximately 0.280 inches, said first and second arbor radial ring teeth being aligned with said first and second arbor channels to provide a clearance of approximately 0.030 inches on each side of said first and second arbor radial ring teeth when passing through said corresponding first and second arbor channels.

26. An arbor for use on a macerating apparatus wherein meat products are passed between two generally parallel rotatable macerating components having a plurality of radially projecting meat penetrating portions and a plurality of axially extending spacer portions, the arbor having improved sanitary characteristics, said arbor comprising:

an elongated generally cylindrical base member of one-piece construction having a first diameter and a plurality of integral radially extending ring members, the radially extending ring members being equally spaced along the longitudinal axis of the base member, adjoining radially extending ring members being separated by intervening spacer portions, said one-piece construction eliminating any mating surfaces between said arbor adjoining ring members and spacer portions wherein meat product remnants may accumulate, the intervening spacer portions also having the base member first diameter, said radially extending ring members having a second diameter which is greater than said base member first diameter, said radially extending ring members each further including a plurality of radially projecting teeth, each of said radially projecting teeth terminating in a peripheral edge having a preselected axial length, each of said intervening spacer portions defining, in combination with its adjoining radially extending ring members, a plurality of channels equally spaced along the longitudinal axis of said arbor.

27. The arbor of claim 26, wherein said cylindrical base member includes a hub portion at an end thereof, said hub portion including a central cavity adapted to engage a drive shaft.

28. The arbor of claim 26, wherein said cylindrical base member includes a central opening adapted to receive a longitudinal driving shaft therein.

* * * * *